(12) United States Patent
Shih

(10) Patent No.: US 7,566,859 B2
(45) Date of Patent: Jul. 28, 2009

(54) INFRARED RAY SWITCHING DEVICE

(75) Inventor: Sen-Tien Shih, Changhua (TW)

(73) Assignee: A.A.A. Beauty Supply Co., Ltd., Changhua (TW)

( * ) Notice: Subject to any disclaimer, the term of this patent is extended or adjusted under 35 U.S.C. 154(b) by 442 days.

(21) Appl. No.: 11/382,391

(22) Filed: May 9, 2006

(65) Prior Publication Data

US 2008/0017786 A1 Jan. 24, 2008

(51) Int. Cl.
*H03K 19/14* (2006.01)

(52) U.S. Cl. .................... 250/214 LS; 250/214 B; 250/338.1; 250/339.11; 340/436

(58) Field of Classification Search ............. 250/214 B, 250/214 LS, 214 RC, 339.06, 339.11, 205, 250/221, 338.1; 340/435, 436, 556; 702/159
See application file for complete search history.

(56) References Cited

U.S. PATENT DOCUMENTS 4,916,613 A * 4/1990 Lange et al. ................ 700/90
5,142,134 A * 8/1992 Kunkel ....................... 250/205
5,235,315 A * 8/1993 Cherry et al. ............... 340/435
7,005,806 B2  2/2006 Shih

* cited by examiner

*Primary Examiner*—Haissa Philogene
(74) *Attorney, Agent, or Firm*—Patterson, Thuente, Skaar & Christensen, P.A.

(57) ABSTRACT

An IR switching device, electrically connected to an apparatus, is provided. The IR switching device comprises an IR transmitter, an IR receiver, a processor, a controller. The IR transmitter is configured to emit an IR signal. The IR receiver is configured to receive a reflected IR signal to generate a response signal accordingly, wherein the reflected IR signal is generated after the IR signal is reflected and the response signal comprising a first signal as the IR receiver receives the reflected IR signal while the response signal comprising a second signal as the IR receiver does not receives the reflected IR signal. The processor is configured to process the response signal and for generating a processing signal after processing the response signal. The controller is configured to switch the apparatus according to the processing signal. One of an emission power of the IR transmitter and a reception power of the IR receiver is adjustable according to the distance requirement. With the present invention, a user does not have to switch the apparatus by touching.

32 Claims, 3 Drawing Sheets

INFRARED RAY SWITCHING DEVICE

BACKGROUND OF THE INVENTION

1. Field of the Invention

The present invention relates to an infrared ray (IR) switching device, particularly, an IR switching device being switched without touching.

2. Descriptions of the Related Art

Virus and bacteria are always brought into human bodies via their hands when people touch things. Though people remove the virus and the bacteria from hands by washing hands and disinfecting with alcohol solutions, people still have to use some switches in public places, such as turning on the light, turning off the light, pressing keys of an elevator, ringing a stop bell of a bus, etc. The virus and the bacteria would adhere to the switches. When people touch the switches, the virus and the bacteria would be bought into human bodies inevitably. To avoid diseases from spreading, a switch device for switching without touching is thus developed.

A conventional capacitance switch is known as a non-touch switch. The conventional capacitance switch emits a high frequency radio wave continuously. When there is a human body approaching, an electrostatic capacity of the human body changes an emission frequency of the high frequency radio wave. The conventional switch detects a change of the emission frequency, and then switches according to the change. The drawbacks of the conventional capacitance switch are illustrated as the following. A stability of the emission frequency is tended to be influenced by an environmental temperature. Moreover, the electrostatic capacity of the human body is tended to be influenced by an environmental humidity. Because of the disadvantages, the performance of the conventional capacitance switch is unstable, and the reliability is not ideal.

Another conventional non-touch switch is designed in a body temperature type. The body temperature switch detects an infrared ray at a wavelength 10 μm radiated from the body temperature of the human body, converts the infrared ray into an electrical signal, and then switches according to the electrical signal. Since the body temperature switch does not comprise an emission unit, this switch detects the temperature in a passive detecting manner.

The body temperature switch has some disadvantages. First of all, a distance for available detection should be large than 5 m for the normal effect of a sensor and a prefilter of the body temperature switch. If the distance is less than 1 m, the performance of the body temperature switch is unstable, and the reliability is getting worse. In the next place, the body temperature switch is only able to switch on and switch off, and is unable to switch gradually for the limitation of the sensor. Furthermore, the body temperature switch is disadaptive for an environment with surrounding heat sources, because some error may be caused by the heat sources.

Yet a further conventional non-touch switch is in an ultrasonic type. The ultrasonic switch comprises an ultrasonic transducer and an ultrasonic receiver. The ultrasonic transducer emits an ultrasonic wave, and then the ultrasonic receiver receives a reflected ultrasonic wave. After comparing the phase difference between the ultrasonic wave and the reflected ultrasonic wave, the ultrasonic switch estimates according to the comparison and then switches. The defects of the ultrasonic switch are described as below. The ultrasonic wave is a sonic wave. During transmitting through air, the speed of transmission is slow, and the transmission is tended to be influenced by the air density and the temperature and thus it results in low reliability during the period of transmission. The scale of the ultrasonic transducer is large for being restrained by the character of the sound wave, and is unsuitable for a small scale requirement of the switch. On the other hand, there is a diffraction problem of the sound wave needed to be dealt with when the ultrasonic transducer is applied within a distance less than 10 cm.

To solve the aforementioned drawbacks of the conventional non-touch switches, a non-touch switch which has high stability and high reliability, is not affected by environmental changes, and switches gradually is urgently needed.

SUMMARY OF THE INVENTION

An object of this invention is to provide an infrared ray (IR) switching device, electrically connected to an apparatus. The IR switching device comprises an IR transmitter, an IR receiver, a processor, and a controller. The IR transmitter is configured to emit an IR signal with an emission power. The IR receiver is configured to receive a reflected IR signal to generate a response signal, wherein the reflected IR signal is generated after the IR signal is reflected and the response signal comprises a first signal as the IR receiver receives the reflected IR signal while the response signal comprises a second signal as the IR receiver does not receives the reflected IR signal. The processor is configured to process the response signal and to generate a processing signal after processing the response signal. The controller is configured to switch the apparatus according to the processing signal. The emission power is adjustable.

Another object of this invention is to provide an infrared ray (IR) switching device, electrically connected to an apparatus. The IR switching device comprises an IR transmitter, an IR receiver, a processor, and a controller. The IR transmitter is configured to emit an IR signal. The IR receiver is configured to receive a reflected IR signal to generate a response signal, wherein the reflected IR signal is generated after the IR signal is reflected and the response signal comprising a first signal as the IR receiver receives the reflected IR signal while the response signal comprising a second signal as the IR receiver does not receives the reflected IR signal. The processor is configured to process the response signal and to generate a processing signal after processing the response signal. The controller is configured to switch the apparatus according to the processing signal. The IR receiver receives the reflected IR signal with an adjustable reception power.

The present invention has advantages of switching the apparatus by touching. Furthermore, the small dimensions, capable of applying in any place, and an effective operation distance is adjustable according to one of the adjustable emission power and the adjustable reception power.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
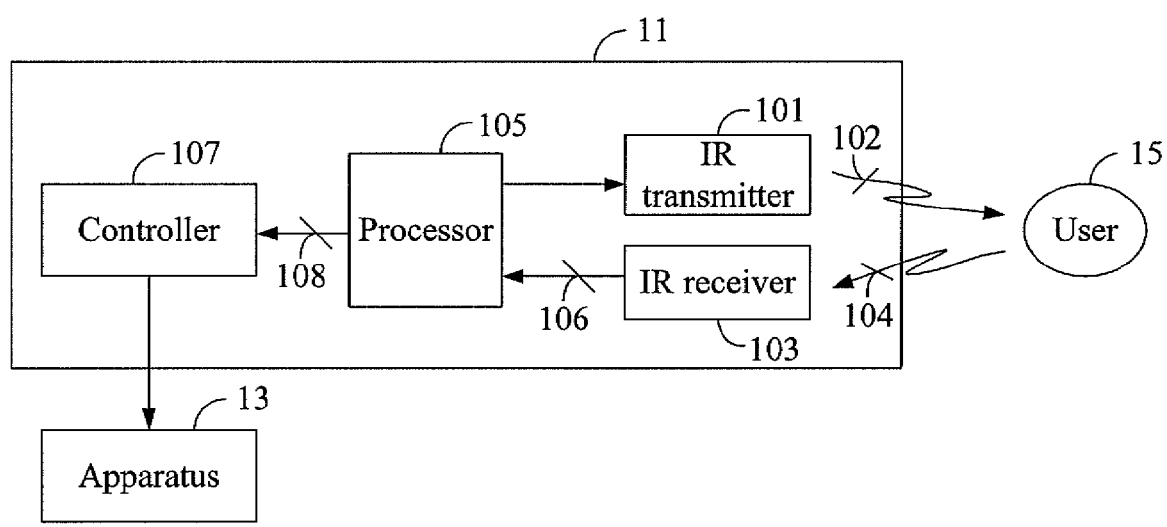
FIG. 1 shows a block diagram of an embodiment in accordance with the present invention.

A first embodiment of the present invention is an infrared ray (IR) switching device 11, as shown in FIG. 1, electrically connected to an apparatus 13. The IR switching device 11 comprises an IR transmitter 101, an IR receiver 103, a processor 105, and a controller 107. The IR transmitter 101 is configured to emit an IR signal 102 with an emission power. The IR signal 102 is a high frequency signal with intervals, i.e. a high frequency carrier. Specially, the emission power of the IR signal 102 is adjustable. To cooperate with a requiring operation distance, especially in a short distance such as 1 cm to 100 cm, the emission power could be adjusted to a suitable value for precision control. The IR receiver 103 is configured to receive a reflected IR signal 104 to generate a response signal 106. Moreover, a high frequency portion of the reflected IR signal 104 is rejected when generating the response signal 106. The reflected IR signal 104 is generated after the IR signal 102 is reflected and the response signal 106 comprises a first signal as the IR receiver 103 receives the reflected IR signal 104 while the response signal 106 comprises a second signal as the IR receiver 103 does not receives the reflected IR signal 104. The processor 105 is configured to process the response signal 106 with a program and to generate a processing signal 108 after processing the response signal 106, wherein the program is written in the processor 105, and is rewritable for different requirements. The controller 107 is configured to switch the apparatus 13 according to the processing signal 108. The controller 107 is a relay, a solid state relay (SSR), a semiconductor power device, and so on. Moreover, an output power of the apparatus 13 is adjustable and the adjustable range thereof is between a maximum output power and a minimum output power, that is, the output power can be any value on condition that the IR switching device 11 and the apparatus 13 are capable of supporting. The IR switching device 11 may further comprise an indicator light for indicating the statuses at a dark situation.

If there is an object in front of the IR switching device 11, for example, a user's hand, the IR signal 102 reflects and the IR receiver 103 receives the reflected IR signal 104 while the response signal 106 comprises the first signal If there is not an object in front of the IR switch device, the IR signal 102 does not reflect at all thereby and the IR receiver 103 does not receive the reflected IR signal 104 while the response signal 106 comprises the second signal. The apparatus 13 will be switched on or switched off once the response signal 106 comprises the first signal and the second signal.

To be adapted for different environments, the controller 107 of the IR switching device 11 switches the apparatus 13 according to an environmental factor. The environmental factor depends on an environmental temperature, an environmental humidity, a body temperature of the user 13, an air density, an environmental light source, or an environmental heat source, etc.

The IR switching device 11 switches according to settings and the modifications of the IR switching device 11 vary. For example, when setting a time spent for continuously receiving the reflected IR signal 104 as a reference for switching the apparatus 13, the apparatus 13 would be switched when exceeding the time. In addition, a modification of the aforementioned example is that the apparatus 13 would be switched gradually on or switched gradually off when exceeding the time.

More specifically, the IR switching device 11 in accordance with the present invention has two modes, a normal mode and a power adjustment mode, for manipulation. In the normal mode, the controller 107 switches the apparatus 13 according to the processing signal 108. For instance, the apparatus 13 is switched on when the response signal 106 comprises the first signal and the second signal. Sequentially, the apparatus 13 is switched off when the response signal 106 comprises the first signal and the second signal again. For the power adjustment mode, the controller 107 switches the apparatus 13 further according to a predetermined time. Furthermore, the predetermined time is adjustable and depends on the needs and the habits of the user. For example, the predetermined time can be one second. The IR switching device 11 would be turned to a power adjustment mode if the time exceeds the predetermined time. In the power adjustment mode, the apparatus 13 would be switched on and an output gradually at an adjustment speed. More specially, the adjustment speed is adjustable and depends on the user's needs and habits as well.

When the output power of the apparatus 13 is adjusted gradually, a power range thereof can be set up at any level between a maximum output power and a minimum output power. The output power of the apparatus 13 can be increasingly adjusted to the maximum output power at the adjustment speed and then decreasingly adjusted from the maximum output power to the minimum output power at the adjustment speed and repeat the procedure of the above-mentioned until the level of the output power is selected. Take a light source as the apparatus 13 for example, the light is getting brighter or darker when the output power of the apparatus 13 is increasing or decreasing. Either the maximum output power or the minimum output power is also adjustable. The controller 107 would stops adjusting the output power as the IR receiver 103 does not receive the reflected IR signal 104. In an alternative embodiment of the present invention, the IR switching device 11 would record a selected output power of the apparatus 13 when the controller 107 stops adjusting. The selected output power is exactly the output power of the apparatus 13 when output power stops increasing or decreasing according to stopping adjusting. After that, once the IR switching device 11 exits the power adjustment mode, the output power of the apparatus 13 is fixed at the selected output power when the apparatus 13 is switch on later. Relatively, the output power of the apparatus 13 can be adjusted to any level in the normal mode as long as the IR switching device 11 and the apparatus 13 are able to support as described above.

A second embodiment of the present invention is an IR switching device 11, electrically connected to an apparatus 13, referring to FIG. 1 as well. The IR switching device 11 comprises an IR transmitter 101, an IR receiver 103, a processor 105, and a controller 107. The IR transmitter 101 is configured to emit an IR signal 102. The IR signal 102 is a high frequency signal with intervals, i.e. a high frequency carrier. The IR receiver 103 is configured to receive a reflected IR signal 104 to generate a response signal 106. Moreover, a high frequency portion of the reflected IR signal 104 is rejected when generating the response signal 106. The reflected IR signal 104 is generated after the IR signal 102 is reflected and the response signal 106 comprising a first signal as the IR receiver 103 receives the reflected IR signal 104 while the response signal 106 comprising a second signal as the IR receiver 103 does not receives the reflected IR signal 104. Moreover, the IR receiver 103 receives the reflected IR signal 104 with an adjustable reception power in this embodiment. To cooperate with a requiring operation distance, the reception power could be adjusted to a suitable value. The processor 105 is configured to process the response signal 106 and to generate a processing signal 108 after processing the response signal 106, wherein the program is written in the processor 105, and is rewritable for different requirements. The controller 107 is configured to switch the apparatus 13 according to the processing signal 108. The controller 107 is a relay, a solid state relay (SSR), a semiconductor power device, and so on. Moreover, an output power of the apparatus 13 is adjustable and the adjustable range thereof is between a maximum output power and a minimum output power, that is, the output power can be any value on condition that the IR switching device 11 and the apparatus 13 are capable of supporting. The IR switching device 11 may further comprise an indicator light for indicating the statuses at a dark situation.

If there is an object in front of the IR switching device 11, for example. a user's hand, the IR signal 102 reflects and the IR receiver 103 receives the reflected IR signal 104 while the response signal 106 comprises the first signal. If there is not an object in front of the IR switch device, the IR signal 102 does not reflect at all thereby and the IR receiver 103 does not receive the reflected IR signal 104 while the response signal 106 comprises the second signal. The apparatus 13 will be switched on or switched off once the response signal 106 comprises the first signal and the second signal.

To be adapted for different environments, the controller 107 of the IR switching device 11 switches the apparatus 13 according to an environmental factor. The environmental factor depends on an environmental temperature, an environmental humidity, a body temperature of the user 13, an air density, an environmental light source, or an environmental heat source, etc.

The IR switching device 11 switches according to settings and the modifications of the IR switching device 11 vary. For example, when setting a time spent for continuously receiving the reflected IR signal 104 as a reference for switching the apparatus 13, the apparatus 13 would be switched when exceeding the time. In addition, a modification of the aforementioned example is that the apparatus 13 would be switched gradually on or switched gradually off when exceeding the time.

More specifically, the IR switching device 11 in accordance with the present invention has two modes, a normal mode and a power adjustment mode, for manipulation. In the normal mode, the controller 107 switches the apparatus 13 according to the processing signal 108. For instance, the apparatus 13 is switched on when the response signal 106 comprises the first signal and the second signal. Sequentially, the apparatus 13 is switched off when response signal 106 comprises the first signal and the second signal again. For the power adjustment mode, the controller 107 switches the apparatus 13 further according to a predetermined time. Furthermore, the predetermined time is adjustable and depends on the needs and the habits of the user. For example, the predetermined time can be one second. The IR switching device 11 would be turned to a power adjustment mode if the time exceeds the predetermined time. In the power adjustment mode, the apparatus 13 would be switched on and an output power of the apparatus 13 would be adjusted gradually at an adjustment speed. More specially, the adjustment speed is adjustable and depends on the user's needs and habits as well.

When the output power of the apparatus 13 is adjusted gradually, a power range thereof can be set up at any level between a maximum output power and a minimum output power. The output power of the apparatus 13 can be increasingly adjusted to the maximum output power at the adjustment speed and then decreasingly adjusted from the maximum output power to the minimum output power at the adjustment speed and repeat the procedure of the above-mentioned until the level of the output power is selected. Take a light source as the apparatus 13 for example, the light is getting brighter or darker when the output power of the apparatus 13 is increasing or decreasing. Either the maximum output power or the minimum output power is also adjustable. The controller 107 would stops adjusting the output power as the IR receiver 103 does not receive the reflected IR signal 104. In an alternative embodiment of the present invention, the IR switching device 11 would record a selected output power of the apparatus 13 when the controller stops adjusting. The selected output power is exactly the output power of the apparatus 13 when output power stops increasing or decreasing according to stopping adjusting. After that, once the IR switching device 11 exits the power adjustment mode, the output power of the apparatus 13 is fixed at the selected output power when the apparatus 13 is switch on later. Relatively, the output power of the apparatus 13 can be adjusted to any level in the normal mode as long as the IR switching device 11 and the apparatus 13 are able to support as described above.

Figure 2A:
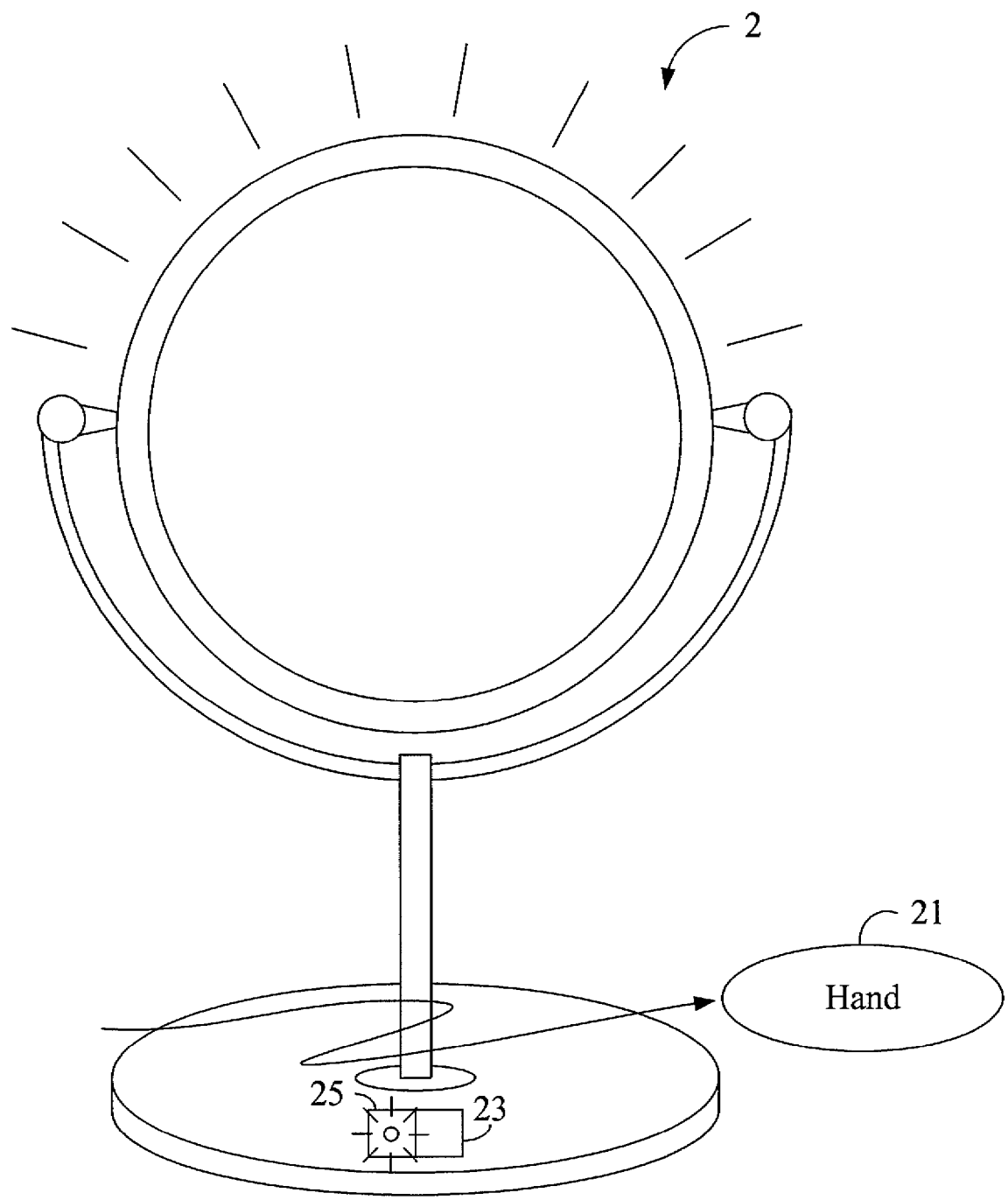
FIG. 2A shows a schematic of a turned-on mirror lamp applied the present invention.
Figure 2B:
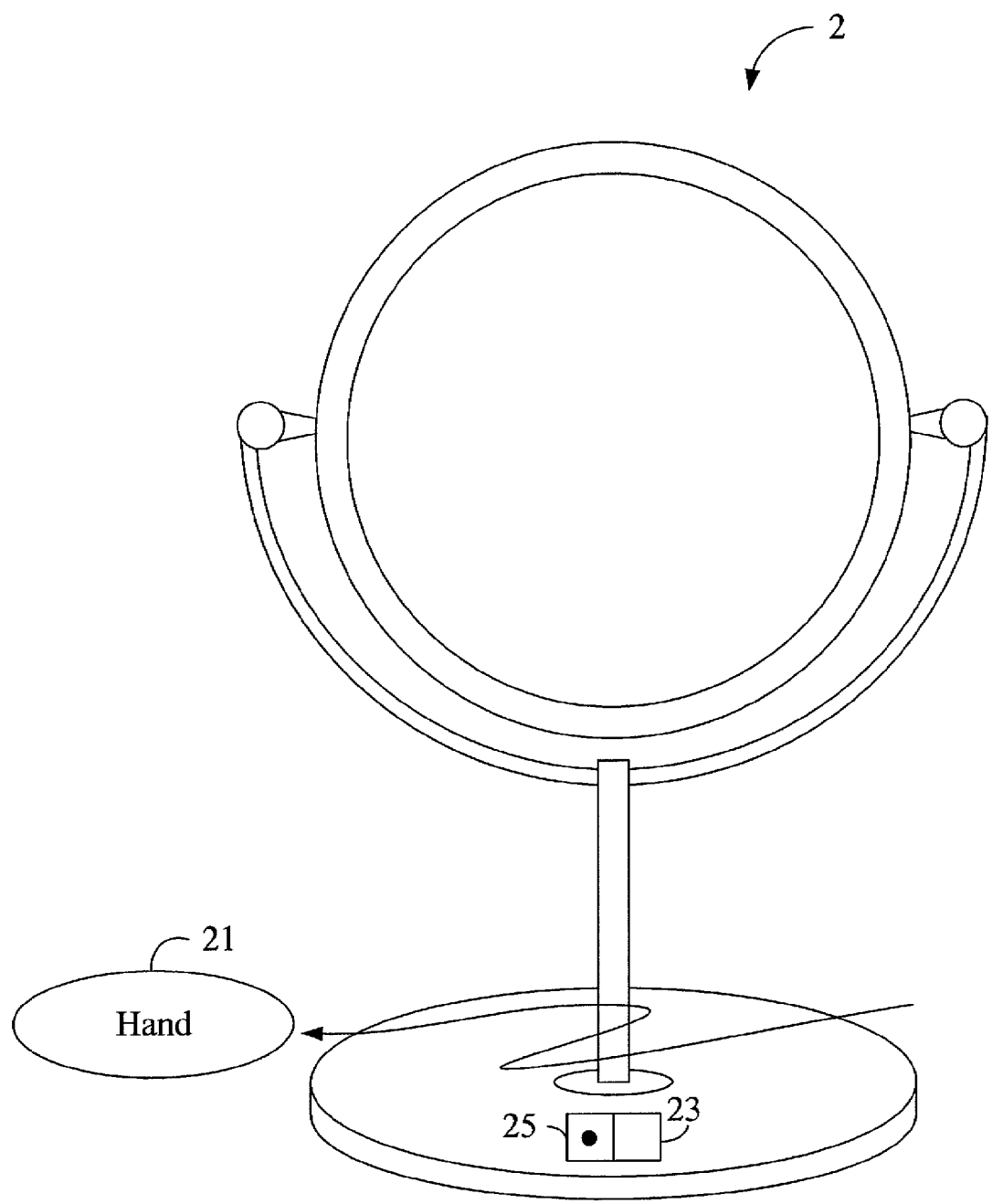
FIG. 2B shows a schematic of a turned-off mirror lamp applied the present invention.

FIG. 2A and FIG. 2B is a schematic of a specific embodiment of the present invention when applying the present invention into a mirror lamp 2 usually used in a bathroom or a living room. A user turns on the mirror lamp 2 by waving the hands 21 above the IR switching device 23, and the indicator light 25 is turned on as shown in FIG. 2A. The user turns off the mirror lamp 2 by waving the hands 21 above the IR switching device 23 again, and the indicator light 25 is turned off as shown in FIG. 2B. With the present invention, the user does not have to contact the switch when turn on or turn off the mirror lamp 2, and would not get an electric shock and prevent a possibility of viruses or diseases infection. On the other hand, the infrared ray switching device disclosed by the present invention could be applied to other situations, such as acting as a controller used in an automatic production line of a factory for precision control in a short distance. The effective range of the switching device disclosed by the present invention could be adjusted to meet the specific requirement.

The IR switching device of present invention uses the IR transmitter 101 and the IR receiver 103 as a detection device. The detection devices in the prior art have the drawbacks of diffraction, instability, and being sensitive about environmental factors. By contrast, the IR signal as utilized in this invention has the characteristic of directivity and thus is not divergent easily. The components of the IR switching device 11 are less, and the structure of the present invention is robust. Moreover, the IR switching device 11 is capable of adjusting for fitting different environment. People may set the requiring operation distance to switch the IR switching device 11 at one's convenience.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An infrared ray IR switching device adapted for an apparatus, the IR switching device electrically connected to an apparatus, comprising:

an IR transmitter for emitting an IR signal with an emission power, wherein the emission power is adjustable;

an IR receiver for receiving a reflected IR signal to generate a response signal, wherein the reflected IR signal is generated after the IR signal is reflected and the response signal comprises a first signal as the IR receiver receives the reflected IR signal while the response signal comprises a second signal as the IR receiver does not receives the reflected IR signal;

a processor for processing the response signal and for generating a processing signal after processing the response signal; and a controller for switching the apparatus according to the processing signal;

wherein the apparatus is switched on when the IR receiver generates the response signal comprising the first signal and the second signal: the apparatus is switched off when the IR receiver generates the response signal comprising the first signal and the second signal again.

2. The IR switching device as claimed in claim 1, wherein the processor processes the response signal with a program.

3. The IR switching device as claimed in claim 1, wherein the emission power is adjusted according to an environmental factor.

4. The IR switching device as claimed in claim 1, wherein the controller switches the apparatus further according to a time spent for continuously receiving the reflected IR signal.

5. The IR switching device as claimed in claim 4, wherein the controller switches the apparatus further according to a predetermined time, the IR switching device is turned to a power adjustment mode if the time exceeds the predetermined time.

6. The IR switching device as claimed in claim 5, wherein the controller switches on the apparatus and gradually adjusts an output power of the apparatus at an adjustment speed in the power adjustment mode.

7. The IR switching device as claimed in claim 5, wherein the predetermined time is adjustable.

8. The IR switching device as claimed in claim 6, wherein the adjustment speed is adjustable.

9. The IR switching device as claimed in claim 6, wherein the controller gradually adjusts the output power of the apparatus between a maximum output power and a minimum output power, and one of the maximum output power and the minimum output power is adjustable.

10. The IR switching device as claimed in claim 5, wherein the controller stops adjusting as the IR receiver does not receive the reflected IR signal.

11. The IR switching device as claimed in claim 10, wherein the IR switching device records a selected output power of the apparatus when the controller stops adjusting.

12. The IR switching device as claimed in claim 11, wherein the output power of the apparatus is the selected output power when the apparatus is switched on after the IR switching device exits the power adjustment mode.

13. The IR switching device as claimed in claim 1, wherein an output power of the apparatus is a maximum output power.

14. The IR switching device as claimed in claim 1, wherein an output power of the apparatus is a minimum output power.

15. The IR switching device as claimed in claim 1, wherein the apparatus is switched on when the response signal comprises the first signal.

16. The IR switching device as claimed in claim 1, wherein the apparatus is switched off when the response signal comprises the second signal.

17. An infrared ray IR switching device adapted for an apparatus, the IR switching device electrically connected to the apparatus, comprising:

an IR transmitter for emitting an IR signal;

an IR receiver for receiving a reflected IR signal to generate a response signal and the IR receiver receiving the reflected IR signal with an adjustable reception power, wherein the reflected IR signal is generated after the IR signal is reflected and the response signal comprising a first signal as the IR receiver receives the reflected IR signal while the response signal comprising a second signal as the IR receiver does not receives the reflected IR. signal;

a processor for processing the response signal and for generating a processing signal after processing the response signal; and a controller for switching the apparatus according to the processing signal;

wherein the apparatus is switched on when the IR receiver generates the response signal comprising the first signal and the second signal: the apparatus is switched off when the IR receiver generates the response signal comprising the first signal and the second signal again.

18. The IR switching device as claimed in claim 17, wherein the processor processes the response signal with a program.

19. The IR switching device as claimed in claim 17, wherein the adjustable reception power is adjusted according to an environmental factor.

20. The IR switching device as claimed in claim 17, wherein the controller switches the apparatus further according to a time spent for continuously receiving the reflected IR signal.

21. The IR switching device as claimed in claim 20, wherein the controller switches the apparatus further according to a predetermined time, the IR switching device is turned to a power adjustment mode if the time exceeds the predetermined time.

22. The IR switching device as claimed in claim 21, wherein the controller switches on the apparatus and gradually adjusts an output power of the apparatus at an adjustment speed in the power adjustment mode.

23. The IR switching device as claimed in claim 21, wherein the predetermined time is adjustable.

24. The IR switching device as claimed in claim 22, wherein the adjustment speed is adjustable.

25. The IR switching device as claimed in claim 22, wherein the controller gradually adjusts the output power of the apparatus between a maximum output power and a minimum output power, and one of the maximum output power and the minimum output power is adjustable.

26. The IR switching device as claimed in claim 21, wherein the controller stops adjusting as the IR receiver does not receive the reflected IR signal.

27. The IR switching device as claimed in claim 26, wherein the IR switching device records a selected output power of the apparatus when the controller stops adjusting.

28. The IR switching device as claimed in claim 27, wherein the output power of the apparatus is the selected output power when the apparatus is switched on after the IR switching device exits the power adjustment mode.

29. The IR switching device as claimed in claim 17, wherein an output power of the apparatus is a maximum output power.

30. The IR switching device as claimed in claim 17, wherein an output power of the apparatus is a minimum output power.

31. The IR switching device as claimed in claim 17, wherein the apparatus is switched on when the response signal comprises the first signal.

32. The IR switching device as claimed in claim 17, wherein the apparatus is switched off when the response signal comprises the second signal.

* * * * *